United States Patent
Hagiwara et al.

(10) Patent No.: US 7,486,651 B2
(45) Date of Patent: Feb. 3, 2009

(54) MOBILE NODE, AN AD HOC NETWORK ROUTING CONTROLLING METHOD AND AN AD HOC NETWORK SYSTEM

(75) Inventors: Junichiro Hagiwara, Yokohama (JP); Hidenori Aoki, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 675 days.

(21) Appl. No.: 11/068,960

(22) Filed: Mar. 2, 2005

(65) Prior Publication Data
US 2005/0195814 A1 Sep. 8, 2005

(30) Foreign Application Priority Data
Mar. 2, 2004 (JP) ............................ 2004-058072
Aug. 30, 2004 (JP) ............................ 2004-250816

(51) Int. Cl.
*H04Q 7/24* (2006.01)
*H04L 12/28* (2006.01)
*H04L 12/56* (2006.01)
*H04L 9/00* (2006.01)
*H04M 1/66* (2006.01)

(52) U.S. Cl. .................. 370/338; 370/349; 380/270; 455/411; 713/153; 713/161; 713/168

(58) Field of Classification Search ............... 370/338, 370/349; 380/270; 455/411; 713/153, 161, 713/168
See application file for complete search history.

(56) References Cited

U.S. PATENT DOCUMENTS 6,879,574 B2 * 4/2005 Naghian et al. .............. 370/338

(Continued)

FOREIGN PATENT DOCUMENTS

JP 2003-230167 8/2003

(Continued)

OTHER PUBLICATIONS

Khalil El-Khatib, et al., "Secure Dynamic Distributed Routing Algorithm for Ad Hoc Wireless Networks", Proceedings of the 2003 International Conference on Parallel Processing Workshops (ICPPW'03), XP-010664136, Oct. 6, 2003, pp. 359-366.

(Continued)

*Primary Examiner*—Alpus H Hsu
(74) *Attorney, Agent, or Firm*—Oblon, Spivak, McClelland, Maier & Neustadt, P.C.

(57) ABSTRACT

A mobile node (400) capable of establishing an ad hoc network routing is disclosed. The mobile node comprises a transmitting/receiving unit (426) for communicating with other communication unit and a routing request generator (422) for generating a routing request message for requiring an ad hoc network routing. The mobile node further comprises: an address storage (427) for storing an address of the mobile node (400) and an address of a receiving node; a random number generator (430) for generating a random number; a certificate issuing unit (440) for issuing a certificate of the mobile node (400); a digital signature creator (450) for creating a digital signature of the mobile node (400); and a controller (424) for transmitting/receiving the routing request message accompanied by the address of the mobile node, the address of the receiving node, the random number, the certificate and the digital signature via the transmitting/receiving unit, according to an ad hoc network protocol.

7 Claims, 18 Drawing Sheets

U.S. PATENT DOCUMENTS

| | | | | |
|---|---|---|---|---|
| 7,039,701 | B2* | 5/2006 | Wesley | 709/224 |
| 7,096,359 | B2* | 8/2006 | Agrawal et al. | 713/168 |
| 7,251,689 | B2* | 7/2007 | Wesley | 709/224 |
| 7,327,683 | B2* | 2/2008 | Ogier et al. | 370/236 |
| 7,346,167 | B2* | 3/2008 | Billhartz et al. | 380/270 |
| 7,349,360 | B2* | 3/2008 | Gutierrez et al. | 370/315 |
| 7,401,217 | B2* | 7/2008 | Huang et al. | 713/153 |
| 2003/0202476 | A1* | 10/2003 | Billhartz et al. | 370/236 |
| 2004/0015689 | A1* | 1/2004 | Billhartz | 713/156 |
| 2004/0025018 | A1 | 2/2004 | Haas et al. | |
| 2005/0025172 | A1* | 2/2005 | Frankel | 370/437 |
| 2005/0036616 | A1* | 2/2005 | Huang et al. | 380/255 |
| 2005/0191990 | A1* | 9/2005 | Willey et al. | 455/411 |

OTHER PUBLICATIONS

Bo Zhu, et al., "Anonymous Secure Routing in Mobile Ad-Hoc Networks", Proceedings of the 29th Annual IEEE International Conference on Local Computer Networks (LCN'04), XP-010753063, Nov. 16, 2004, pp. 102-108.

Shayan Ghazizadeh, et al., "Security-Aware Adaptive Dynamic Source Routing Protocol", Proceeding of the 27th Annual IEEE Conference on Local Computer Networks (LCN'02), XP-010628240, Nov. 6, 2002, pp. 751-760.

Kimaya Sanzgiri, et al., "A Secure Routing Protocol for Ad Hoc Networks", Network Protocols, Proceedings of the 10th IEEE International Conference on Network Protocols (ICNP'02), XP-010632569, Nov. 12, 2002, pp. 78-87.

Andrew Tanenbaum, "Computer Networks", XP-002330888, Aug. 31, 2002, pp. 757-758.

Lidong Zhou, et al., "Securing Ad Hoc Networks". IEEE Network, XP-000875728, vol. 13, No. 6, Nov. 1999, pp. 24-30.

Keng Seng Ng, et al., "Routing Security and Data Confidentiality for Mobile Ad hoc Networks", Vehicular Technology Conference 2003, XP-002330887, vol. 3, Apr. 25, 2003, pp. 1821-1825.

Roohie Naaz Mir, et al., "Secure Distributed Routing in Ad Hoc Networks", IEEE Tencon 2003, XP-010687434, vol. 4 of 4, Oct. 15, 2003, pp. 1091-1095.

* cited by examiner

MOBILE NODE, AN AD HOC NETWORK ROUTING CONTROLLING METHOD AND AN AD HOC NETWORK SYSTEM

BACKGROUND OF THE INVENTION

The present invention generally relates to a mobile node, an ad hoc network routing controlling method and an ad hoc network system, in which privacy is strongly protected.

As demands for mobile communications are rapidly expanded and diversified, it is required to connect a mobile terminal existing outside an area covered by the nearest mobile communication base station to a mobile communication network. Since it is impossible to directly one-hop-connect such outside mobile terminal even to the nearest base station, a wireless ad hoc network proposal has been made in which such an outside mobile terminal is multi-hop-connected to a base station via other mobile terminal or a temporary simple relaying station. A wireless ad hoc network is a network which is temporarily established by utilizing a mobile terminal or a temporary simple relaying station and the like (See FIG. 1). Each mobile terminal and simple relaying station contain an ad hoc routing protocol, and according thereto each terminal voluntarily exchanges information to establish an ad hoc network. In the ad hoc network, it is important to secure privacy since information can be received by a variety of terminals.

One example of such ad hoc network system is the DSR (Dynamic Source Routing) system in which a new route is established after a mobile terminal generates a routing request. In the DSR system, a transmitting terminal (node) can send data by knowing all node addresses on a route directed to a receiving node. Nodes for relaying the data can understand the next destination to forward to, utilizing forwarded routing information, and therefore the relaying nodes do not contain the routing information, resulting in simple processing. By utilizing the ad hoc network, it becomes possible to provide an outside mobile terminal with cellular communication service, the Internet connecting service and other services. This type of communication system has a gateway node 16 as shown in FIG. 1. The gateway node 16 functions as components in both the ad hoc network and the mobile communication network, and bridges the ad hoc network and the mobile communication network. Any communication node can become a gateway node D. After the gateway node D moves to outside a service area of the mobile communication network, the node cannot be a gateway any longer and becomes just a mobile node.

An ad hoc network is constructed as shown in FIG. 1. Ad hoc networks are not limited to radio communications but can be applied to wired communications also.

A mobile node S(12) establishes an ad hoc network according to an ad hoc routing controlling protocol. In the example shown in FIG. 1, the mobile communication node S(12) is connected to a gateway node D(16) via a relaying node T1(14) and a relaying node T2(15) to establish an ad hoc network. Since the gateway D(16) is in an area covered by a base station B(18), the mobile node S(12) can be connected to the base station B(18) via the gateway node D(16) and enjoy services provided through the base station B(18) (See Patent Document #1).

An example of conventional routing control scheme in the DSR is generally shown in FIGS. 2 and 3. This control scheme is now being discussed in the MANET (Mobile Ad-hoc Networks) Working Group in the IETF (The Internet Engineering Task Force).

With reference to FIGS. 2 and 3, such a conventional routing establishment procedure is explained below. A transmitting node S (Source) shown in FIGS. 2 and 3 corresponds to the mobile node S shown in FIG. 1, but not limited to this and may be a gateway node or other mobile nodes. A receiving node D (Destination) shown in FIGS. 2 and 3 corresponds to the gateway node D shown in FIG. 1, but not limited to this and may be mobile nodes. Relaying nodes T (Transmitter) T1, T2 shown in FIGS. 2 and 3 correspond to the relaying nodes 14, 15 shown in FIG. 1, respectively, but not limited to them. The two relaying nodes T1, T2 shown in FIG. 3 have the same structure and function, and therefore FIG. 2 representatively shows only one relaying node T.

When the transmitting node S starts communication with the receiving node D, a request/reply generator 222 generates a RREQ (Route REQuest) signal that requests ad hoc network routing generation. A transmitter/receiver 226 transmits the RREQ to a network by broadcasting. A transmitting node address $ADD_S$ and a receiving node address $ADD_D$ are read out from an address storage 227, added to the RREQ, and transmitted together. Such an address may be an IP address, for example. The control message RREQ may contain information relating the upper limitation on the number of hops.

A transmitter/receiver 246 of the relaying node T1 receives the control message RREQ. The relaying node T1 compares the received address $ADD_D$ with its own address $ADD_{T1}$ stored in an address storage 247. If the relaying node T1 finds that the control message RREQ is not directed to itself, then it adds its own address $ADD_{T1}$ and transmits the control message RREQ by broadcasting.

The relaying node T2 performs a similar forwarding processing.

The receiving node D receives the control message RREQ, and compares the received address $ADD_D$ with its own address $ADD_D$ stored in an address storage 267. If the receiving node D finds that the control message RREQ is directed to itself, it adds a duplication of the relayed address information to a RREP (Route REPly) message and transmits back to the transmitting node S by uni-casting.

The relaying node T2 receives the RREP. If the relaying node T2 finds its own address in a relaying address list, it forwards this signal by uni-casting.

The relaying node T1 performs similar processing.

The transmitting node S receives the RREP. Based on the combination of address information ADDS and $ADD_D$, the transmitting node S recognizes that this signal is a reply to the RREQ previously sent by itself, and understands the relayed routing information (S-T1-T2-D).

[Patent Document #1] Japanese Laid-open Publication 2003-230167

However, in a conventional DSR ad hoc network system, there is no authentication on the routing control signals RREQ or RREP, and therefore there is a risk that wrong routing control information is adapted. The address information of the transmitting node, the receiving node and the relaying nodes is stored in the header under condition that everyone can read them, and therefore third parties can easily identify the transmitting node and the receiving node, resulting in a privacy problem.

SUMMARY OF THE INVENTION

A general object of the present invention is to provide a routing control method and a mobile node which can avoid a risk of adapting wrong routing control information, by authenticating a RREQ signal and a RREP signal in an ad hoc network.

Another object of the present invention is to provide a routing control method and a mobile node which can hide the address information of a transmitting node, a receiving node and relaying nodes and improve privacy protection.

The above object of the present invention is achieved by a mobile node (400) capable of establishing an ad hoc network routing, having a transmitting/receiving unit (426) for communicating with other communication unit and a routing request generator (422) for generating a routing request message for requiring an ad hoc network routing, comprising: an address storage (427) for storing an address of the mobile node (400) and an address of a receiving node; a random number generator (430) for generating a random number; a certificate issuing unit (440) for issuing a certificate of the mobile node (400); a digital signature creator (450) for creating a digital signature of the mobile node (400); and a controller (424) for transmitting/receiving the routing request message accompanied by the address of the mobile node, the address of the receiving node, the random number, the certificate and the digital signature via the transmitting/receiving unit, according to an ad hoc network protocol.

The object of the present invention is achieved also by an ad hoc network routing controlling method for generating an ad hoc network between plural communication nodes, comprising the steps of: at a transmitting node, transmitting data by broadcasting, the data comprising an ad hoc routing request signal accompanied by a transmitting node address, a receiving node address and a transmitting node digital signature; at a relaying node, authenticating the transmitting node digital signature, adding a relaying node address and a relaying node digital signature to the ad hoc routing request signal and forwarding the ad hoc routing request signal by broadcasting; and at a receiving node, receiving the data and authenticating the relaying node digital signature and the transmitting node digital signature; and at the receiving node, adding a receiving node digital signature to the received data to make an ad hoc routing reply signal, and transmitting the ad hoc routing reply signal to the transmitting node.

The object of the present invention is achieved also by an ad hoc network routing controlling method for generating an ad hoc network between plural communication nodes, comprising the steps of; at a transmitting node, encrypting at least a portion of data with a public key of a receiving node and transmitting data by broadcasting, the data comprising an ad hoc routing request signal accompanied by a transmitting node address and a receiving node address; at a relaying node, adding a relaying node address to the ad hoc routing request signal and forwarding the ad hoc routing request signal by broadcasting; and at a receiving node, receiving the data and adding an ad hoc routing reply signal to the data, and transmitting the ad hoc routing reply signal to the transmitting node.

DESCRIPTION OF THE PREFERRED EMBODIMENTS

Figure 1:
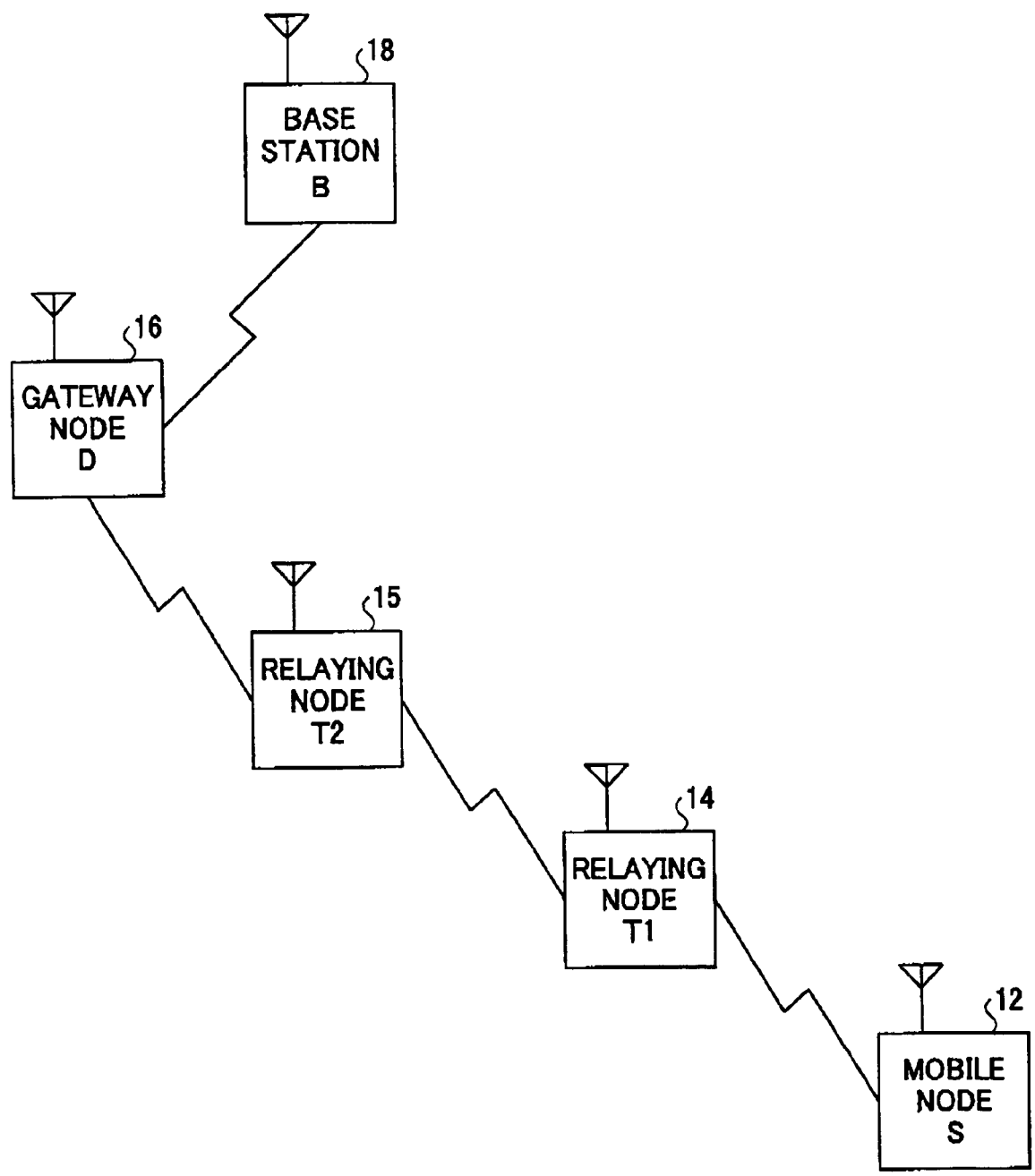
FIG. 1 schematically shows a concept of an ad hoc network.
Figure 2:
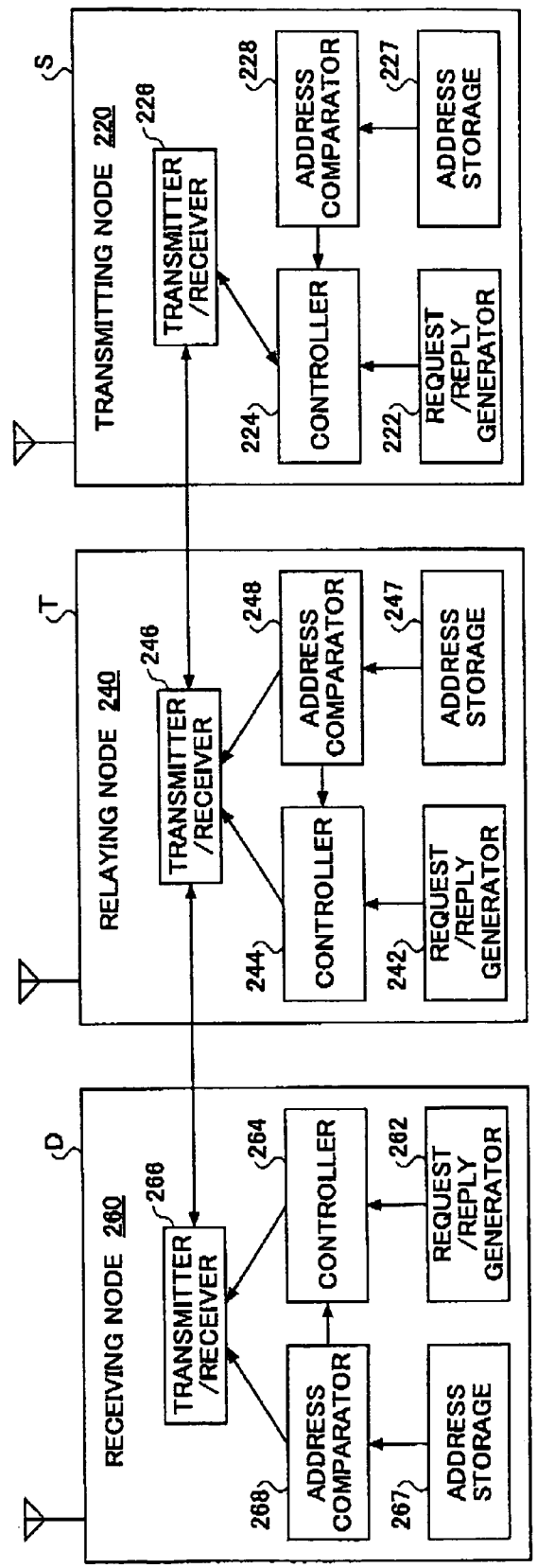
FIG. 2 is a block diagram of mobile nodes capable of constructing the ad hoc network.

The following is a description of embodiments of the present invention, with reference to the accompanying drawings.

Throughout all the figures, members and parts having the same functions are assigned the same or similar reference numerals and redundant explanations are omitted.

The following two matters are set forth as premises of each embodiment of the present invention.

1) All nodes (terminals) have certificates of rout CA (Certificate Authority), and can issue their own certificates and create secret keys, by any means.

2) It is possible to know correspondent node address prior to start communication, by any means.

First Embodiment

Figure 4:
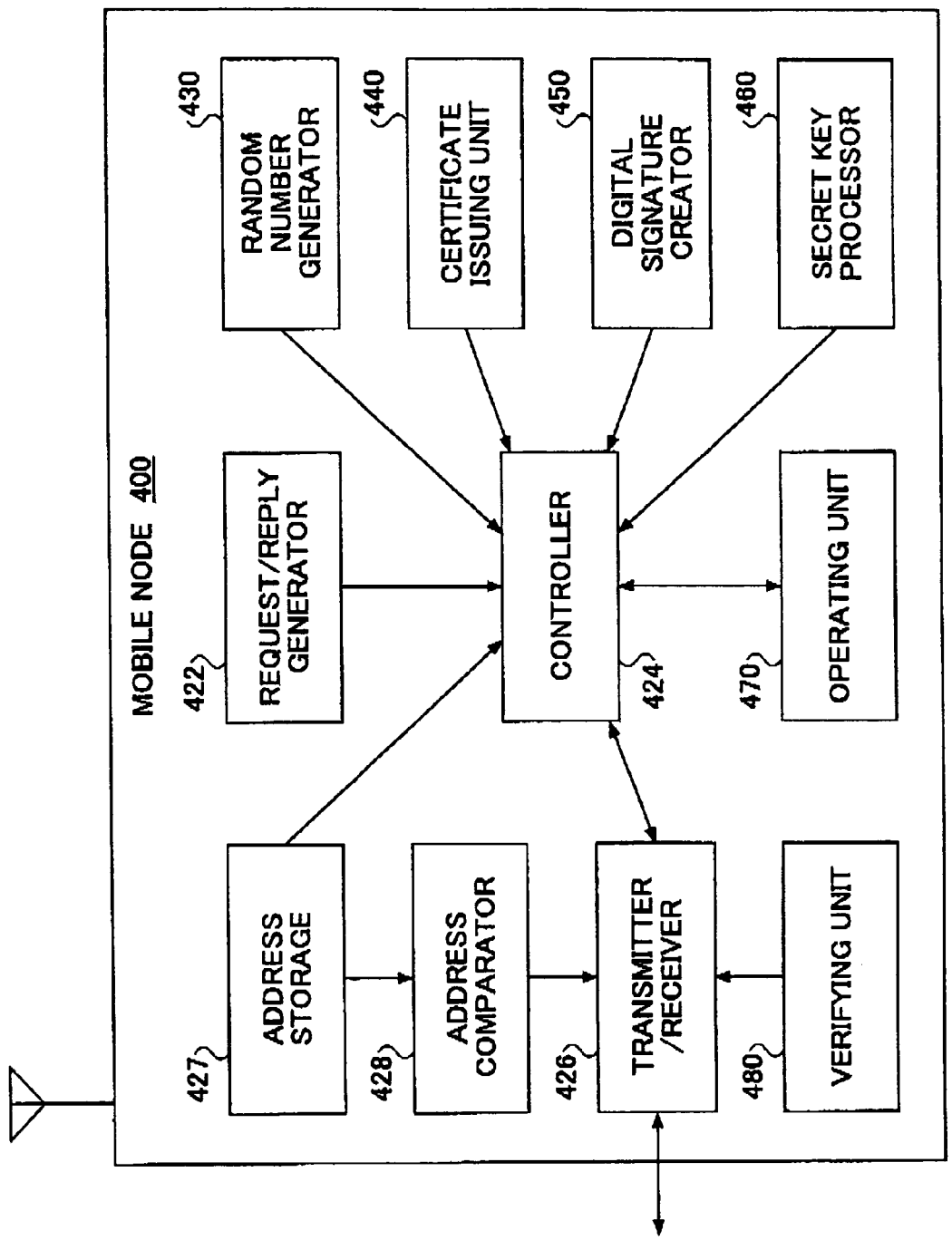
FIG. 4 is a block diagram of a mobile node according to an embodiment of the present invention.
Figure 5:
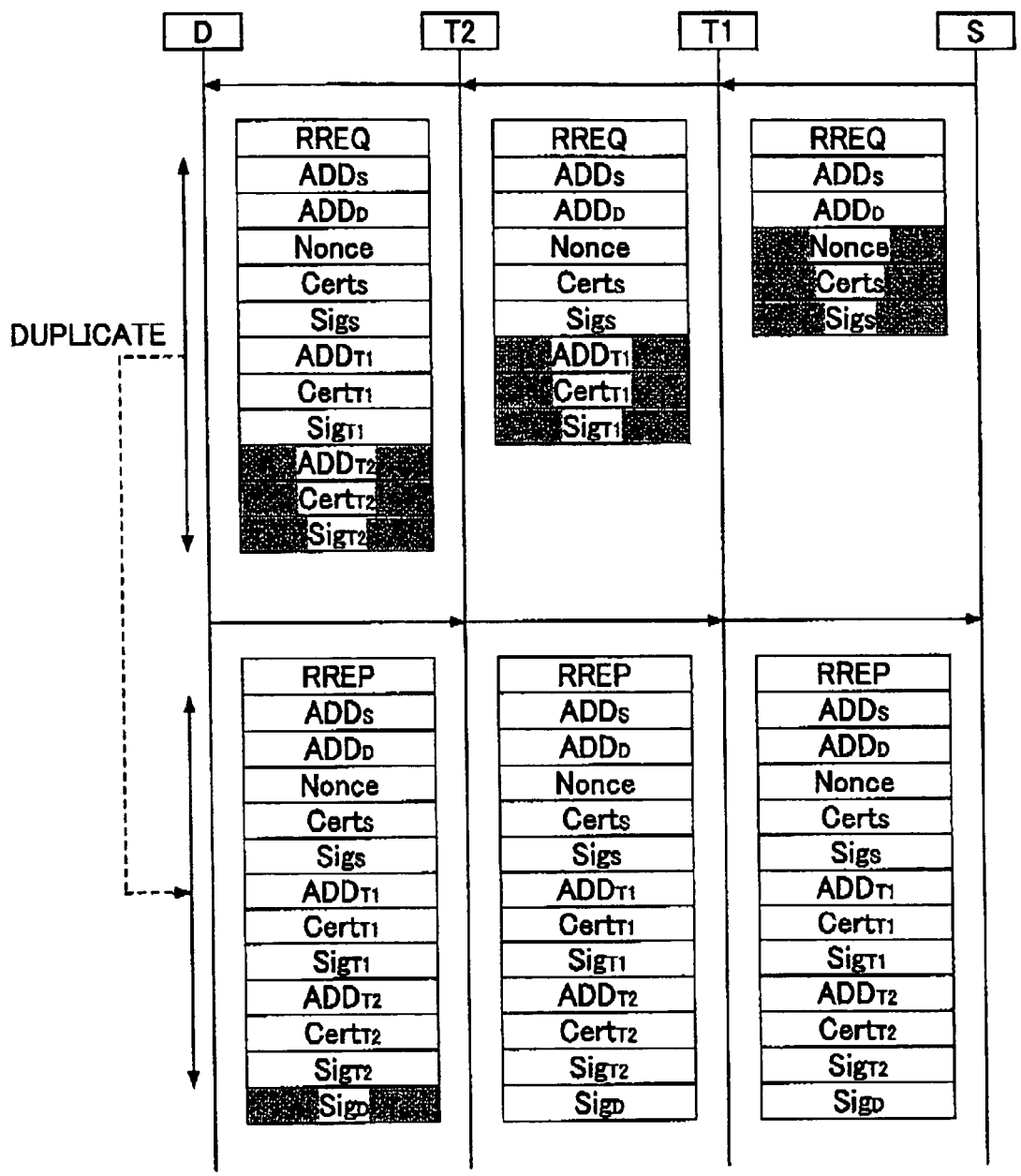
FIG. 5 is a chart illustrating routing control signals for constructing an ad hoc network according to a first embodiment of the present invention.

With reference to FIGS. 4 and 5, a first embodiment of the present invention is explained below. A mobile node (terminal) 400 according to the first embodiment of the present invention comprises a request/reply generator 422, a controller 424, a transmitter/receiver 426, an address storage 427, an address comparator 428, a random number generator 430, a certificate issuing unit 440, a digital signature creator 450, a secret key processor 460, an operating unit 470 and a verifying unit 480. This structure is not limited to a transmitting node. Not only a transmitting node but also a relaying node or receiving node may have a similar structure. The present invention can be applied to not only radio mobile communications but also to wire communications.

A route request control message RREQ generated by the request/reply generator 422 is broadcast-transmitted by the transmitter/receiver 426 to a network.

Figure 3:
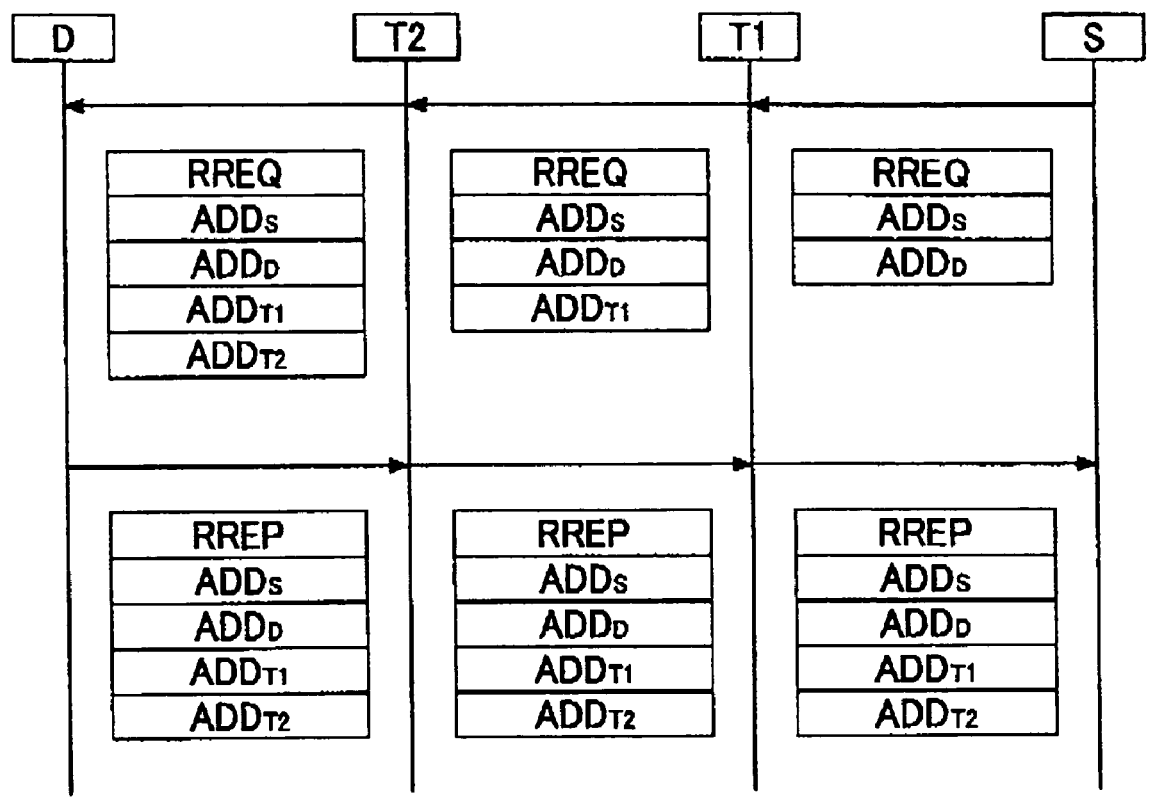
FIG. 3 is a chart illustrating routing control signals for constructing the ad hoc network.

In the first embodiment, as shown in FIG. 5, an authentication is applied to the RREQ at each hop (that is, the transmitting node S—the relaying node T1—the relaying node T2—the receiving node D). To an RREP signal, one authentication is applied only to end-to-end (that is, the receiving node D—the transmitting node S). Fields in FIG. 5 that are different from FIG. 3, are shown shaded. A symbol "Nonce" shown in FIG. 5 means a random number generated by the random number generator 430. "$Cert_x$" means a certificate of a node x issued by the certificate issuing unit. "$Sig_x$" means a digital signature by a node x, which is created by the digital signature creator.

In a prior DSR, no authentication is applied to an RREQ signal or an RREP signal. In the present invention, authentications are applied to these signals. Since an authentication is applied to the RREQ at each relaying node, it is believed that one authentication applied to the returning RREP only during end-to-end is enough.

Operation of each node is explained below. First, the random number generator 430 of the transmitting node S determines a random number "Nonce". The certificate issuing unit 440 issues a "$Cert_S$". The controller 424 adds the "Nonce" and its own certificate "$Cert_S$" to the control message RREQ. The purpose of adding the random number "Nonce" is to protect the ad hoc network from re-sending attacks. Since the receiving node D does not necessarily know transmitting node information, the certificate "$Cert_S$" of the transmitting node itself is added. Against the total fields of the RREQ signal accompanied by the "Nonce" and the certificate "$Cert_S$", the digital signature creator 450 creates its own digital signature "$Sig_S$". The RREQ signal accompanied by the "Nonce", "$Cert_S$" and "$Sig_S$" is broadcasted to the network by the transmitter/receiver 426.

The verifying unit 480 of the relaying node T1 that has received the signal RREQ performs verification on the "Nonce" added to the received signal RREQ by a known method. If the present "Nonce" is the same as a previously received Nonce, the present RREQ is considered to be a re-sent one and is discarded. If the present "Nonce" is the first received one, the verifying unit 480 verifies the digital signature "$Sig_S$" by a known method, by using the added certificate "$Cert_S$". If there is no problem as a result of the verification, the relaying node T1 compares the "$ADD_D$" with its own address and confirms that the received signal is not directed to oneself. Next, the relaying node T1 adds its own address "$ADD_{T1}$" and certificate "$Cert_{T1}$" to the received signal, and creates a its own digital signature "$Sig_{T1}$" against the total signal accompanied by "$ADD_{T1}$" and "$Cert_{T1}$". The RREQ accompanied by "$ADD_{T1}$", "$Cert_{T1}$" and "$Sig_{T1}$" is forwarded to the network by broadcasting.

The receiving node D receives the RREQ signal from the relaying node T2, and the verifying unit 480 of the receiving node D verifies the received "Nonce". If the received "Nonce" is the same as a previously received Nonce, the present RREQ is considered to be a re-sent one and is discarded. If the present "Nonce" is the first received one, the verifying unit 480 of the receiving node D verifies a digital signature "$Sig_{T2}$" added by the relaying node T2 by a known method, by using an added certificate "$Cert_{T2}$". If there is no problem as a result of the verification, the receiving node D compares the "$ADD_D$" with its own address and confirms that the received signal is directed to itself. Using the added certificate "$Cert_{T1}$", the receiving node D verifies the digital signature "$Sig_{T1}$" of the relaying node T1. Using the added certificate "$Cert_S$", the receiving node D verifies the digital signature "$Sig_S$" of the transmitting node S. The order of these processing can be changed.

A duplication of the total contents of the RREQ signal is added to a reply control message RREP generated by the request/reply generator of the receiving node D. The receiving node D creates its own digital signature "$Sig_D$" against the total fields of the RREP signal accompanied by the RREQ duplication. The RREP signal accompanied by "$Sig_D$" is transmitted to the transmitting node S by uni-casting.

The relaying node T2 receives the RREP signal from the receiving node D, and verifies the Nonce. The relaying node T2 finds its own address "$ADD_{T2}$" in the relaying address list, and forwards this signal as it is by uni-casting.

The relaying node T1 performs the same processing as the relaying node T2 did.

The transmitting node S receives the RREP signal via the relaying node T1, and the verifying unit 480 of the transmitting node S verifies the Nonce first and then performs the following processing.

Since the transmitting node S can not find its own address $ADD_S$ in the relaying address list, verifies whether this RREP signal is directed to oneself. Based on combination of "$ADD_S$", $ADD_D$", "Nonce", "$Cert_S$" and "$Sig_S$", the transmitting node recognizes that this RREP is a response to the RREQ previously sent by itself. The "$Sig_D$" is verified. The "Sig" for each relaying route is verified. That is, the RREP is replaced by the RREQ and the "$Sig_D$" is deleted. After verifying the "$Sig_{T2}$", the "$ADD_{T2}$", "$Cert_{T2}$", "$Sig_{T2}$" are deleted. After verifying the "$Sig_{T1}$", the "$ADD_{T1}$", "$Cert_{T1}$", "$Sig_{T1}$" are deleted. The relaying route information (S-T1-T2-D) is fixed.

Second Embodiment

Figure 6:
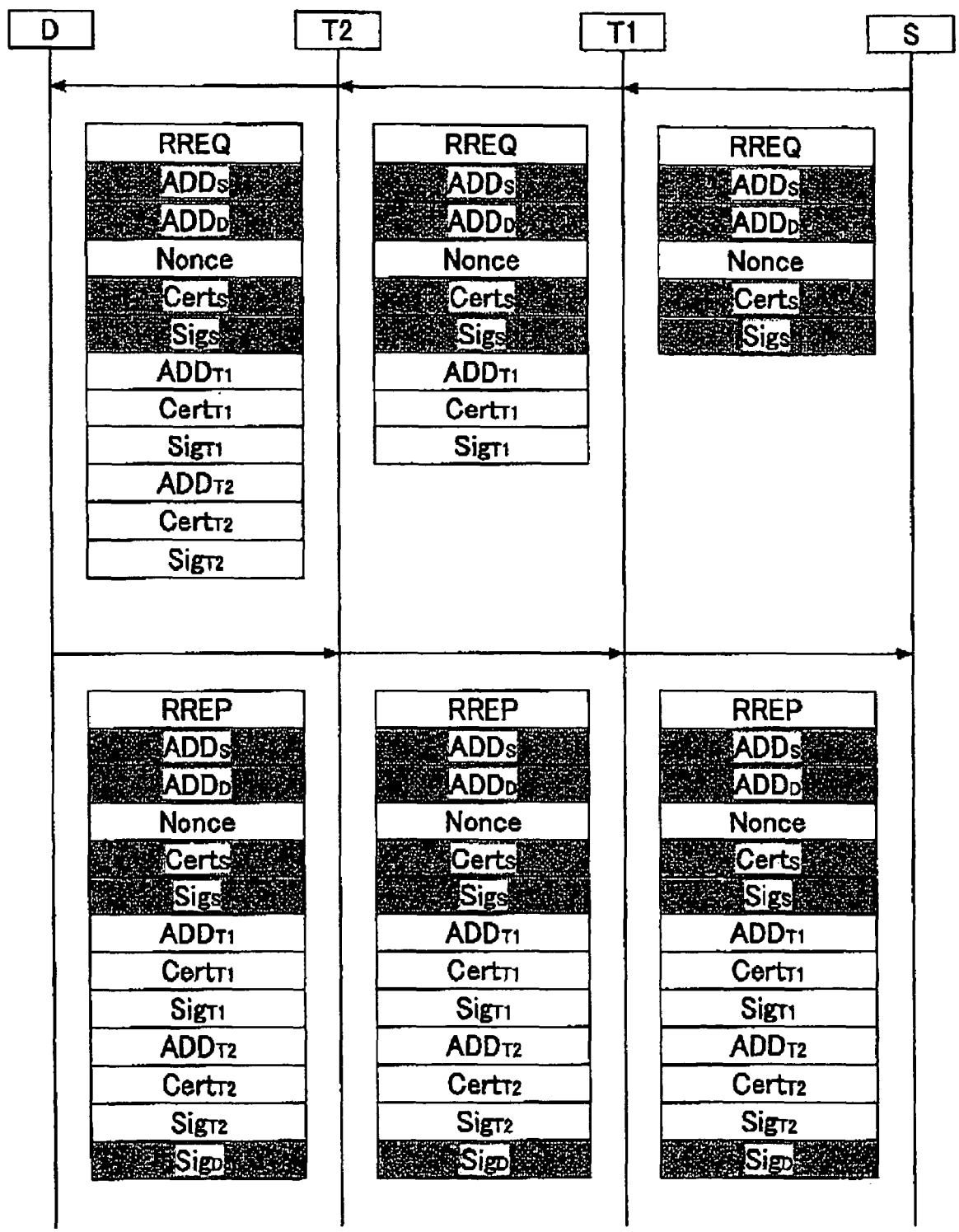
FIG. 6 is a chart illustrating routing control signals for constructing the ad hoc network according to a second embodiment of the present invention, showing a transmitting node and a receiving node exposed to third parties.

With reference to FIGS. 6 through 10, a second embodiment of the present invention is explained below, FIG. 6 is the same as FIG. 5 except that the information about nodes S and D is shown shaded. As shown in FIG. 6, the first embodiment cannot protect privacy. For example, in an area where users are limited, there is a risk that the $Cert_S$ and therefore the transmitting node S are exposed by trying all certificates.

In this embodiment, the shaded fields in FIG. 6 are encrypted and hided so as to be known only by nodes S and D in order to improve privacy protection.

The common key encryption system is known as a basic encryption system. In the common key encryption system, a transmitting node S encrypts plain data using a common secret key and transmits the cipher data, and a receiving node D receives the cipher data and decrypts them using the same common secret key. Since the procedures for encrypting and decrypting use the equivalent but opposite directed process, the common key encryption is referred to as "symmetric algorithm" also. Because the encryption and decryption use the same key, the processing speed is high. However, there is a risk that once after the "common key" is leaked to third parties, all the cipher data thereafter may be broken.

Figure 7:
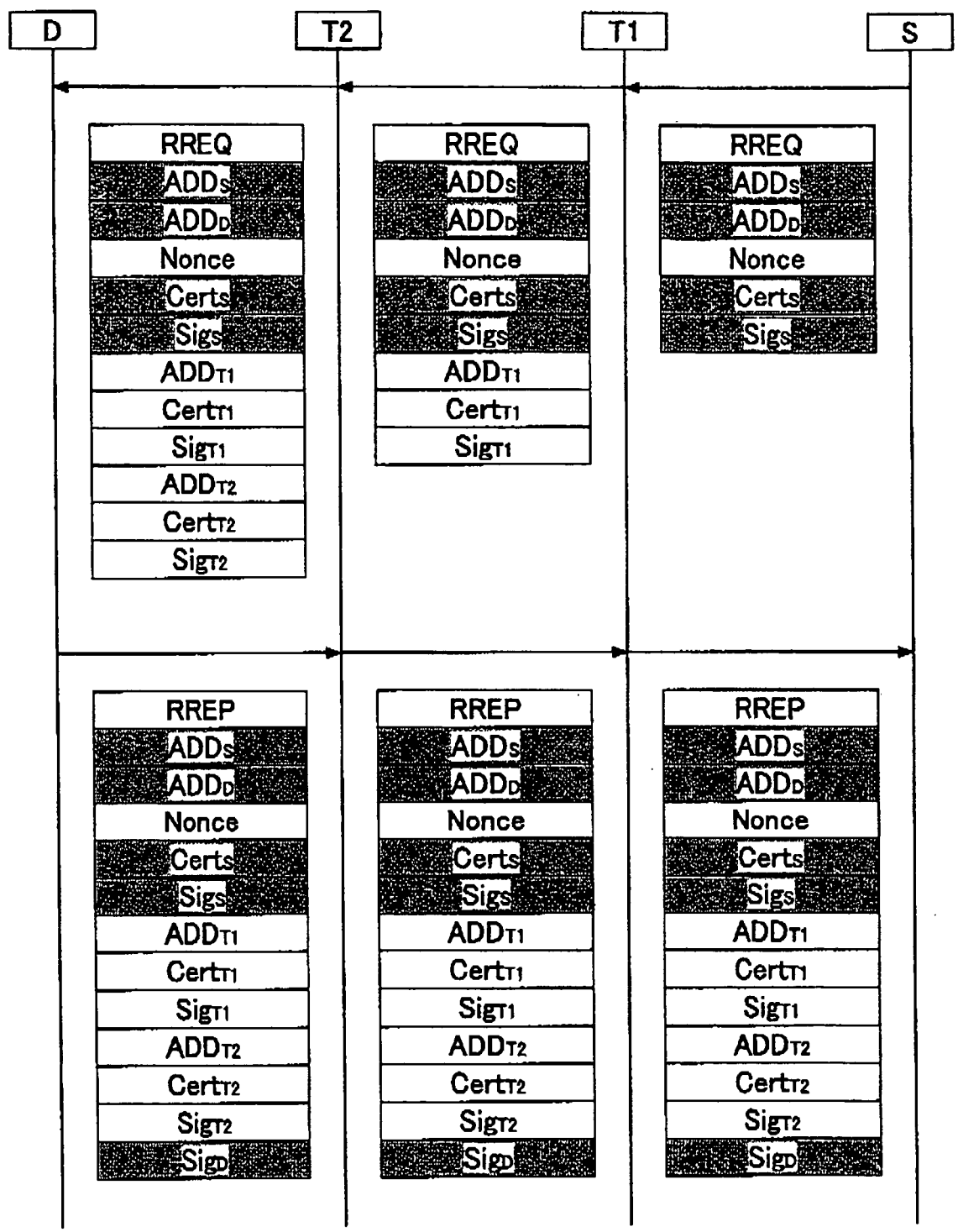
FIG. 7 is a chart illustrating routing control signals for constructing the ad hoc network according to the second embodiment of the present invention, showing a temporary address for ADDS.

In an example shown in FIG. 7, a temporary address is used as the address $ADD_S$ of the transmitting address S, and the public key encryption is applied to other factors.

The public key encryption system or asymmetric algorithm is a system in which keys used for encrypting and decrypting are different from each other. A receiving node creates a pair of a "public key" and a "secret key (or private key)". One key publicly disclosed to other parties is referred to as a "public key", and another key "secret key" is kept by the receiving node. A transmitting node obtains the public key of a receiving party, encrypts plain data using the public key, and transmits the cipher data. The receiving party receives the cipher data and decrypts the cipher data using the secret key kept by the receiving party.

$E_x[Y]$ means encrypting a plain text Y using a public key of a node x herein. In the transmitting node S shown in FIG. 7, the address $ADD_D$ of the receiving node D, and the certificate $Cert_S$ and the digital signature $Sig_S$ of the transmitting node S may be encrypted using the public key of the receiving terminal D ($E_D[ADD_D]$, $E_D[Cert_S]$, $E_D[Sig_S]$). The receiving node D receives these encrypted data and decrypts them using its secret key. When sending back, the receiving node D encrypts its own digital signature $Sig_D$ using the public key of the transmitting node S ($E_S[Sig_D]$). This procedure, however, has the following problems.

1) Under some algorithm of public key encryption system, the same plain text may be encrypted to the same result. Although the $ADD_D$ is unknown, new address $E_D[ADD_D]$ is always exposed and there is a risk of tracing.

2) There is a similar risk for temporary addresses.

Accordingly, it gives stronger privacy protection to encrypt the same plain text so as to get different result each time.

Figure 8:
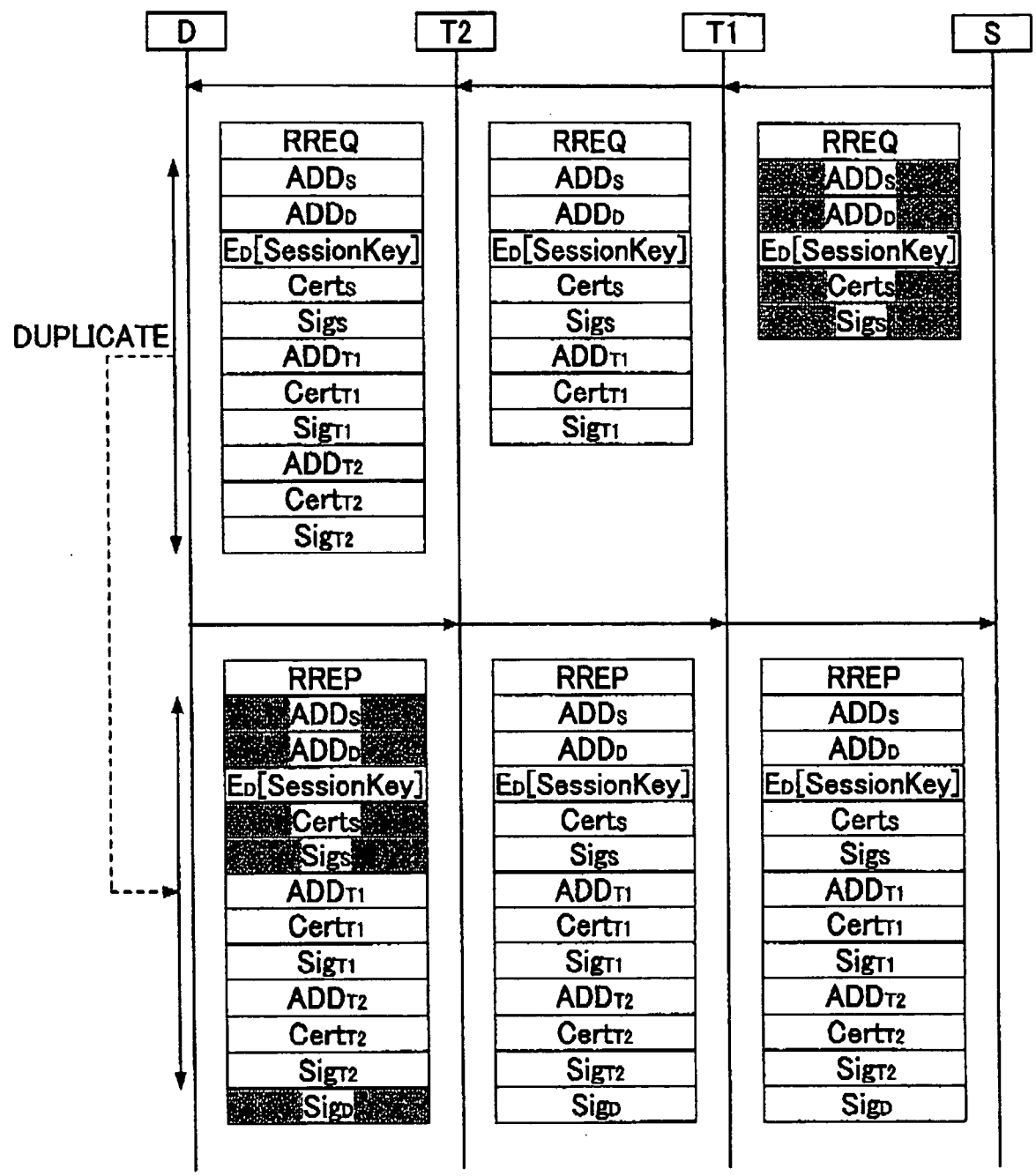
FIG. 8 is a chart illustrating routing control signals for constructing the ad hoc network according to the second embodiment of the present invention, showing hybrid encryption.

In order to solve the above problems, a second embodiment employing a hybrid encryption system as shown in FIG. 8 is explained below.

In the hybrid encryption system, the following procedures are carried out. The transmitting node S and the receiving node D previously share a common key. The receiving node D creates a pair of a "secret key (or private key)" and a "public key". The "private key" is disclosed and the "secret key" is kept in the receiving node D. The transmitting node S obtains the "public key" of the receiving node D, encrypts the common key using the public key, and transmits the encrypted common key to the receiving node D. The transmitting node S symmetrically encrypts plain data using the encrypted common key, and transmits the encrypted data.

The receiving node D receives the encrypted common key and encrypted data, and decrypts the common key using the secret key. Then, using the decrypted common key, the receiving node D decrypts the encrypted data. Since the plain data is encrypted by the high speed common key encryption system, high processing speed is obtained. Since the common key itself is encrypted, high level security is obtained. In order to improve the security level, the above common key can be changed at each session. In this case, the transmitting node S symmetrically encrypts plain data using a disposable common key (Session Key) at each session, and encrypts the Session Key with the public key and send it to the receiving node D.

In an example shown in FIG. 8, a temporary address is applied to the transmitting node address ADDS, the hybrid encryption is applied to other factors. Operation (especially portions different from FIG. 3) in the example shown in FIG. 8 is explained below.

The random number generator 430 of the transmitting node S (cf. FIG. 4) randomly determines a temporary address of the transmitting node S. The random number generator 430 further randomly determines a Session Key. The secret key processor 460 encrypts the Session Key with the public key of the receiving node D to create $E_D$[Session Key]. Since the $E_D$[Session Key] can take a role of Nonce, the Nonce shown in FIG. 3 is deleted and replaced by the $E_D$[Session Key]. The secret key processor 460 uses the Session Key, and obtains symmetric key encryption output (pseudo random number series). The operating unit 470 calculates an exclusively OR between the above pseudo random number series and the transmitting node temporary address $ADD_S$, the receiving node address $ADD_D$, the transmitting node certificate $Cert_S$ and their digital signature $Sig_S$ (against all the fields). The transmitter/receiver 426 transmits the total RREQ by broadcasting.

The relaying node T1 that has received the RREQ assumes that an RREQ having a certain length is the true RREQ from the transmitting node S, does not verify the $Sig_S$, performs processing similar to FIG. 3 case and forwards the RREQ signal. The relaying node T2 also performs similar processing and forwards the signal.

The receiving node that has received the RREQ signal from the relaying node T2 performs the following processing.

The receiving node decrypts the encrypted common key $E_D$[Session Key] with its own secret key to obtain the common key (Session Key). Using the obtained Session Key, the receiving node D gets a symmetrical encryption output (pseudo random number series). Data is decrypted and recovered by calculating exclusive OR between the obtained pseudo random number series and the hided fields.

When sending back, the random number generator 430 of the receiving node D creates new pseudo random number series (different from the received random number series), and encrypts again the signal with the new pseudo random number series. That is, the receiving node D calculates exclusive OR between the new pseudo random number and the ADDS, $ADD_D$, $Cert_S$, $Sig_S$ and $Sig_D$. That means that the $ADD_S$, $ADD_D$, $Cert_S$, $Sig_S$ and $Sig_D$ of the RREP signal are masked with the random number series of nodes S and D.

The transmitting node that has received the RREP signal forwarded via the relaying nodes T1, T2 performs the following processing.

Before verifying whether the RREP signal is directed to itself, the transmitting node S deletes the pseudo random number series set by the receiving node D. In order to output pseudo random number series, a CTR mode is generally employed.

Figure 9:
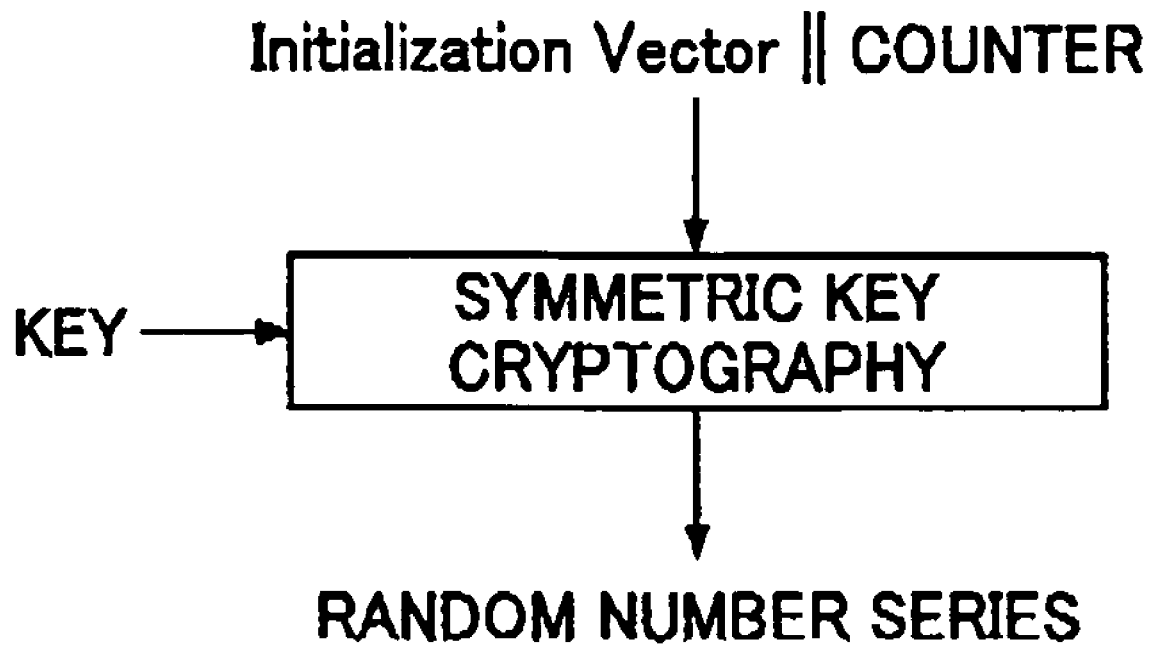
FIG. 9 is a concept of CTR mode according to the second embodiment of the present invention.

FIG. 9 generally shows the concept of the CRT mode. It is desired that an Initialization Vector (referred to as "IV" herein after) is secretly shared by transmitting and receiving nodes. A counter (referred to as "ct" herein after) should be synchronized between the transmitting and receiving nodes, and therefore it is desired to add a counter value to a packet to send it in order to reduce the influence of out of synchronization.

Figure 10:
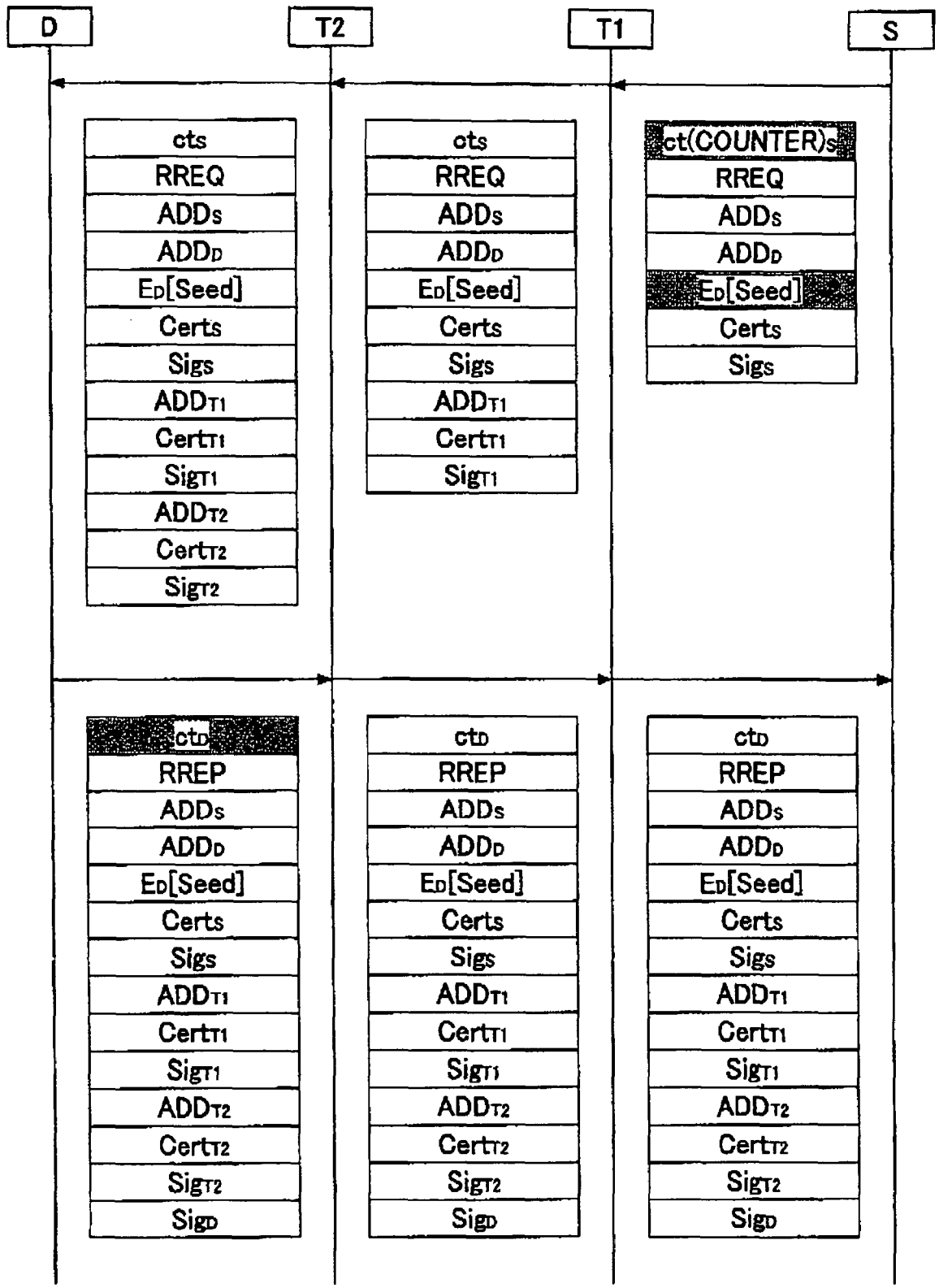
FIG. 10 is a chart illustrating routing control signals for constructing the ad hoc network according to the second embodiment of the present invention, showing the CTR mode.

FIG. 10 shows an example in which the CTR mode is used in the symmetrical key encryption system. Operation (portions different from FIG. 5) is explained below.

The IV is sent together with the Session Key (represented by "||" herein after), that is Seed=Session Key || IV. A ct can be independently selected by the transmitting node S and the receiving node D respectively (each represented by $ct_S$, $ct_D$), which is added to the top of the packet. If the ct increases continuously, the order of the transmitted packets is known to third parties, and therefore the ct should be random. The ct can take a role of the Nonce.

Third Embodiment

Figure 11:
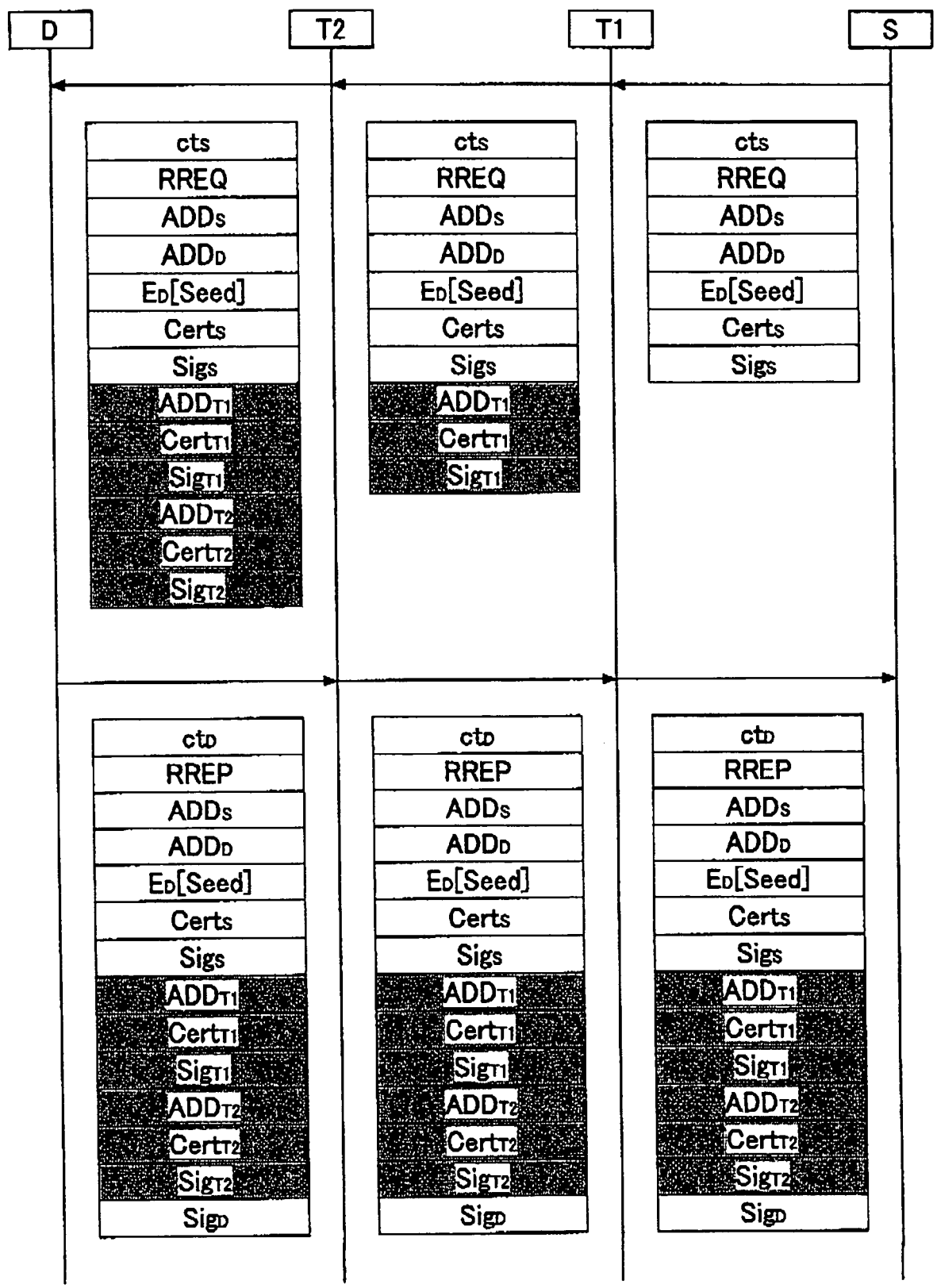
FIG. 11 is a chart illustrating routing control signals for constructing the ad hoc network according to a third embodiment of the present invention, showing relaying information exposed to third parties.
Figure 12:
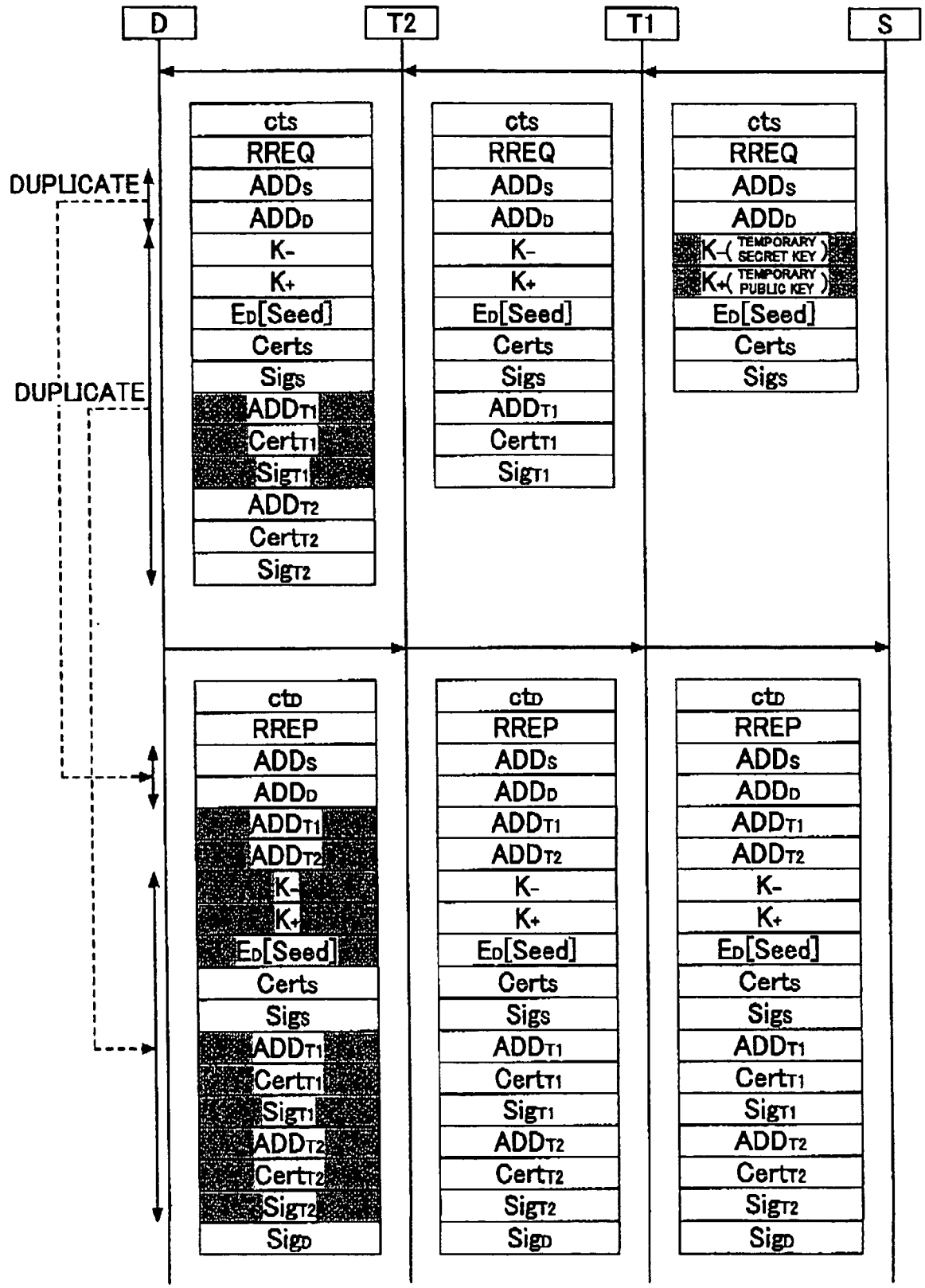
FIG. 12 is a chart illustrating routing control signals for constructing the ad hoc network according to third embodiment of the present invention, showing a temporary public key.

With reference to FIGS. 11 and 12, a third embodiment of the present invention is explained below.

FIG. 11 is the same as FIG. 10 except that portions of the relaying node information exposable to third parties are shown shaded. Considering the necessity of relaying node information, although the transmitting node S and the receiving node D need to know all the relaying node information, the relaying nodes themselves only have to determine the following matters.

1) As for the RREQ signal, confirmation whether the signal is directed to itself, authenticity of information from the preceding node.

2) As for RREP signal, whether itself is included in a forwarding address list.

Accordingly, since unnecessary information exposure may be a target for attacking, it is desired to hide the relaying node information as much as possible from any other than the transmitting node S and the receiving node D. An example is explained below, in which the shaded portions in FIG. 11 are hidden from any other than the nodes S and D in order to improve privacy protection.

In FIG. 12, a temporary public key is applied to the RREQ in order to hide the shaded portions in FIG. 11, a symmetric key is applied to widen portions of the RREP.

Operation (especially portions different from FIGS. 8, 10) is explained below.

Before transmitting the RREQ signal, the random number generator 430 of the transmitting node S determines a pair of a temporary public key (K+) and a temporary secret key (K−). Both the temporary public key K+ and the temporary secret key K− are added to the RREQ and sent, and only the temporary secret key K− is a target for calculating exclusive OR of pseudo random number series.

The relaying node T2 that has received the RREQ signal accumulatively encrypts the preceding relaying node information ($ADD_{T1}$, $Cert_{T1}$, $Sig_{T1}$ in this case) using K+. In this manner, even if a malicious node intentionally deletes the preceding relaying node information in the reverse order, the receiving node D can detect such malicious act, due to the accumulative encryption.

The receiving node D has received the RREQ signal performs the following processing.

The receiving node D verifies the Sig of every relaying node. After verifying the $Sig_{T2}$, the receiving node D deletes $ADD_{T2}$, $Cert_{T2}$, $Sig_{T2}$. The receiving node D decrypts all the relaying node information using the temporary secret key K−. The receiving node D verifies the $Sig_{T1}$, deletes $ADD_{T1}$, $Cert_{T1}$, $Sig_{T1}$, and verifies the $Sig_S$.

In general, the following sequential processing is repeated at the number of time same as the number of relaying, which can be expected based on the length of all the relaying information. The sequential processing is a series of processing of decrypting using the temporary secret key K−, verifying the outermost Sig and deleting the outermost added information.

When sending back, the receiving node D calculates exclusive OR between all the information duplicated from the RREQ and pseudo random number series (different from the received random number series) newly created by the receiving node D, to encrypt again and create the RREP. An area covered by the mask pattern is widened, K−, K+, $E_D$[Seed], $ADD_{T1}$, $Cert_{T1}$, $Sig_{T1}$, $ADD_{T2}$, $Cert_{T2}$, and $Sig_{T2}$ are also mask-patterned.

Since all the information duplicated from the RREQ is mask-patterned, the $ADD_{T1}$ and $ADD_{T2}$ are concealed and not known to the relaying nodes. Then the values of the $ADD_{T1}$ and $ADD_{T2}$ are stored in the newly established relaying node address list field.

The transmitting node S that has received the RREP signal performs the following processing.

The transmitting node S decrypts the received encrypted common key $E_D$[Seed] and verifies it. Since the transmitting node S cannot find out its own address in the relaying address list, it removes the random number series. Based on the combination of the $ADD_S$, $ADD_D$, Seed, $Cert_S$, and $Sig_S$, the transmitting node S recognizes that the RREP is a response to the RREQ previously sent by itself. $Sig_D$ is verified. Every Sig of each relaying route is verified. That is the RREP is replaced by the RREQ, and the $Sig_D$ is removed. After verifying the $Sig_{T2}$, the fields $ADD_{T2}$, $Cert_{T2}$, and $Sig_{T2}$ are removed. After verifying the $Sig_{T1}$, the fields $ADD_{T1}$, $Cert_{T1}$, and $Sig_{T1}$ are removed. The relaying route information (S-T1-T2-D) is fixed.

Fourth Embodiment

Figure 13:
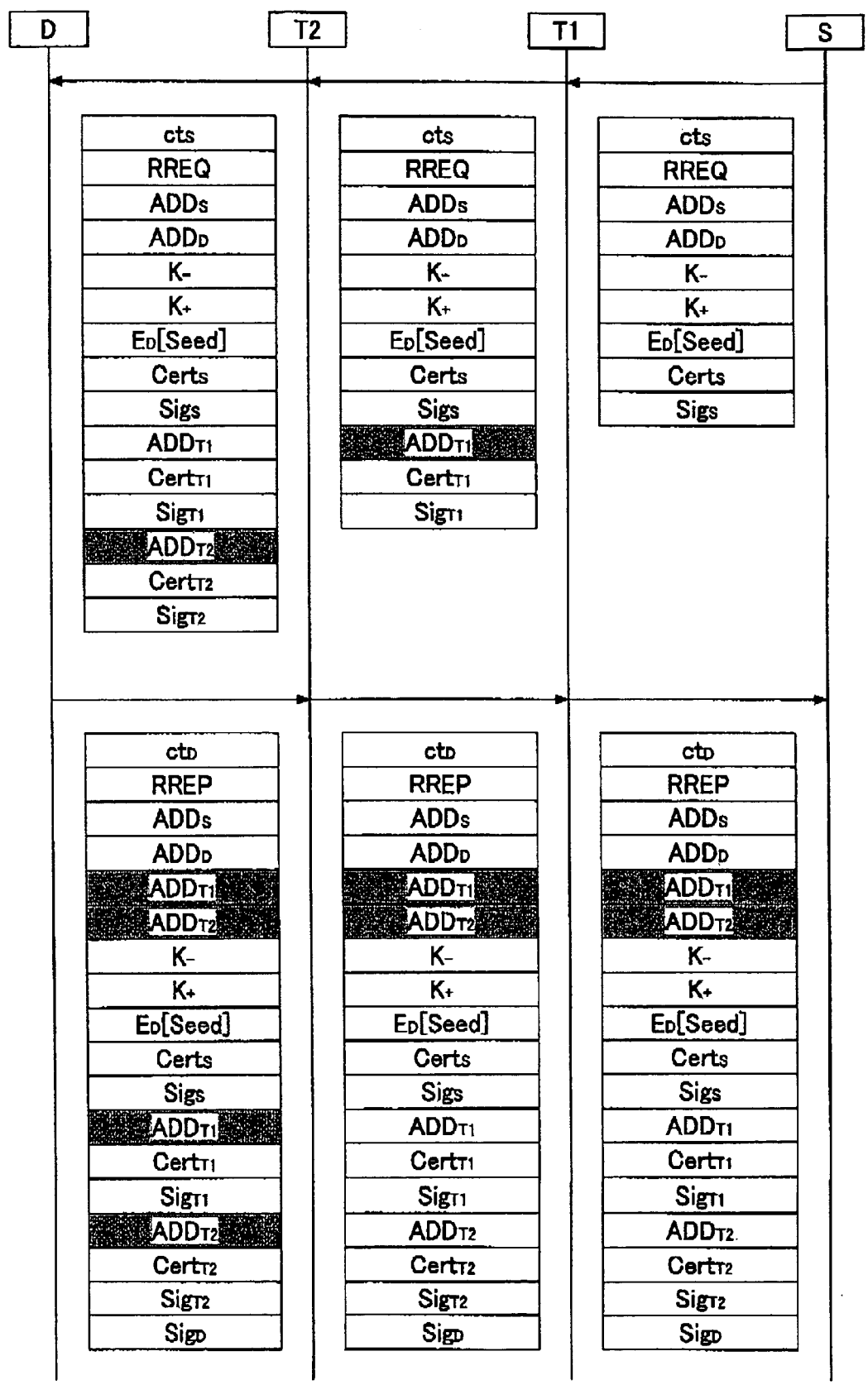
FIG. 13 is a chart illustrating routing control signals for constructing the ad hoc network according to a fourth embodiment of the present invention, showing relaying node addresses exposed to third parties.
Figure 14:
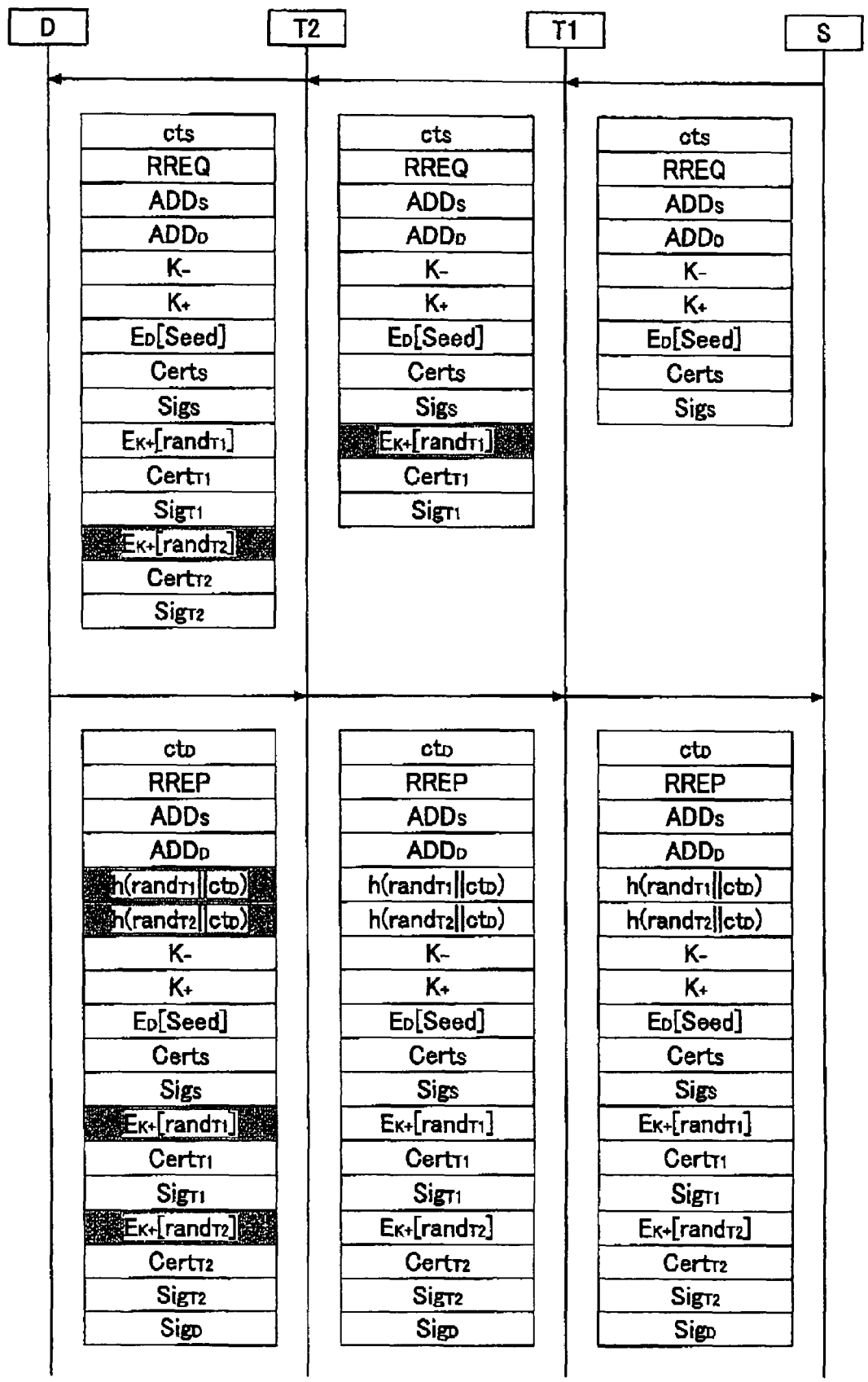
FIG. 14 is a chart illustrating routing control signals for constructing the ad hoc network according to the fourth embodiment of the present invention, showing a Hasche function.

With reference to FIGS. 13 and 14, a fourth embodiment of the present invention is explained below. FIG. 13 is the same as FIG. 12 except that portions of the relaying node information that are exposed to third parties are shown shaded. It is desired to hide the relaying node addresses from any other than the transmitting node S and the receiving node D as much as possible. An example in which the shaded fields in FIG. 13 are hidden from any other than the transmitting node S and the receiving node D in order to improve privacy protection is explained below.

A simple way is to temporary addresses are used as the $ADD_{T1}$, $ADD_{T2}$. In this way, however, the same addresses are used during plural packets, and therefore there is a risk where the packet relations are exposed. Accordingly, the temporary addresses may be changed for each packet, resulting in stronger protection against privacy leakage. In order to deal with this issue, a temporary public key and the Hasche function can be considered.

FIG. 14 shows an example where the random number is encrypted with a temporary public key in the RREQ signal, and the Hasche function is applied to the random number in the RREP signal, in order to hide the shaded fields. Operation (especially portions different from FIG. 9) is explained below. A symbol "$rand_x$" means a random number determined by a node x, and "h(y)" means a Hasche value of y. The Hasche function is a function or procedure for summarizing a series of characters such as numbers or documents into data having a certain length. An output obtained by operating the Hasche function is referred to as a "Hasche value". Typical examples of the Hasche function are "SHA-1" and "MD5". These functions are uni-direction function, and therefore it is impossible to estimate the original text based on created data. When transmitting and receiving data through a communication line, if Hasche values of data are obtained at both ends of the line and compared with each other, it is possible to detect whether the transmitted data is altered on the way of the communication line.

The relaying node T1 receives the RREQ signal and establishes $E_{K+}[rand_{T1}]$ in place of its own address $ADD_{T1}$.

The relaying node T2 performs the same processing as the relaying node T1.

The receiving node D receives the RREQ signal, obtains the $\text{rand}_{T1}$, $\text{rand}_{T2}$, and applies $h(\text{rand}_{t1}\|c_{TD})$, $h(\text{rand}_{T2}\|c_{TD})$ in place of the raw value of $\text{ADD}_{T1}$, $\text{ADD}_{T2}$.

The relaying node T2 receives the RREP signal, and recognizes $h(\text{rand}_{T2}\|c_{TD})$ as its address.

The relaying node T1 performs the same node T2.

The transmitting node S receives the RREP signal and performs the following processing.

When finding its own address in the relaying address list, the transmitting node S checks $h(\text{rand}_S\|ct_D)$, then obtains the $\text{rand}_{T1}$, $\text{rand}_{T2}$.

Fifth Embodiment

Figure 15:
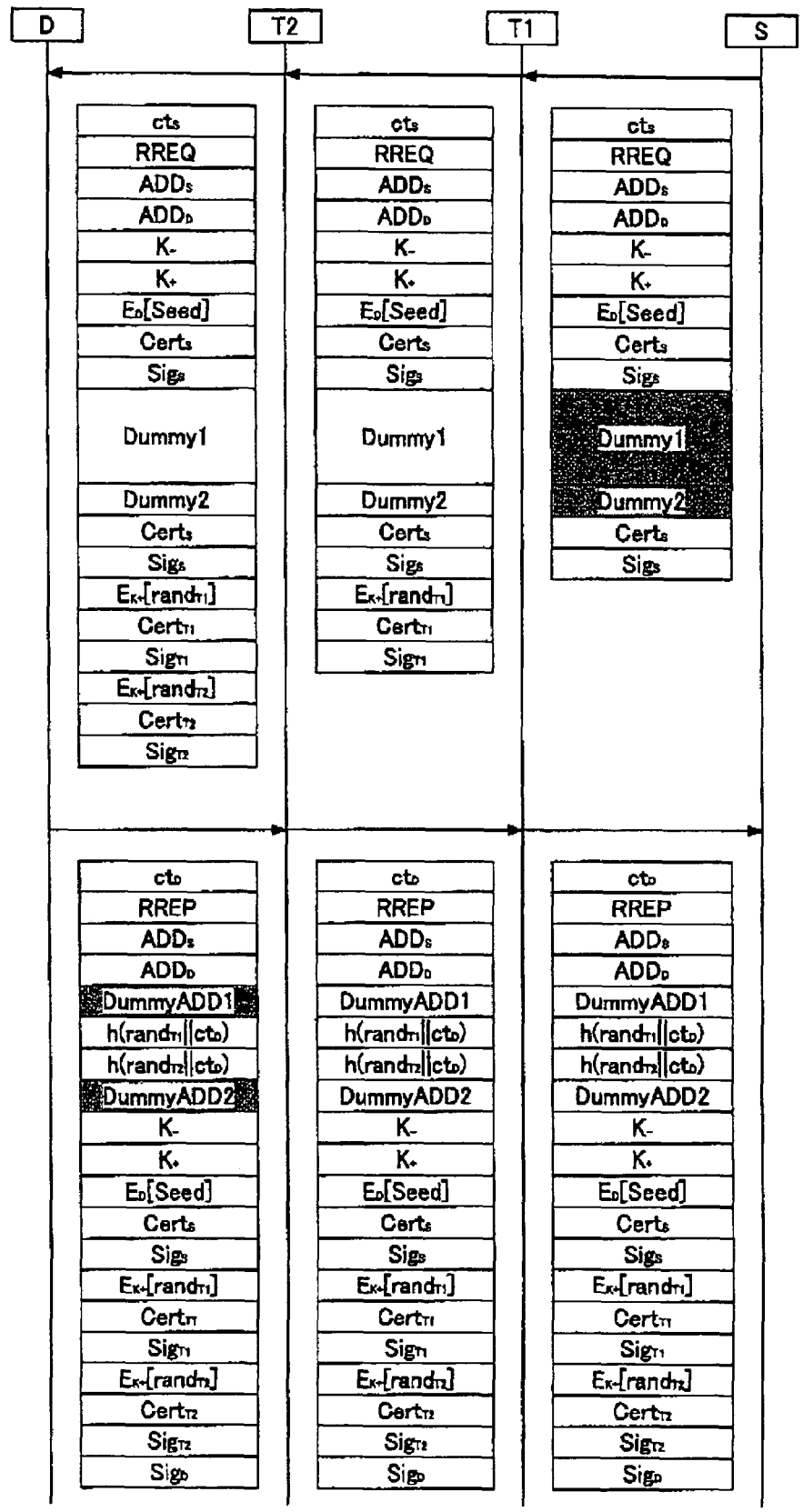
FIG. 15 is a chart illustrating routing control signals for constructing the ad hoc network according to a fifth embodiment of the present invention, showing Dummy information added.
Figure 16:
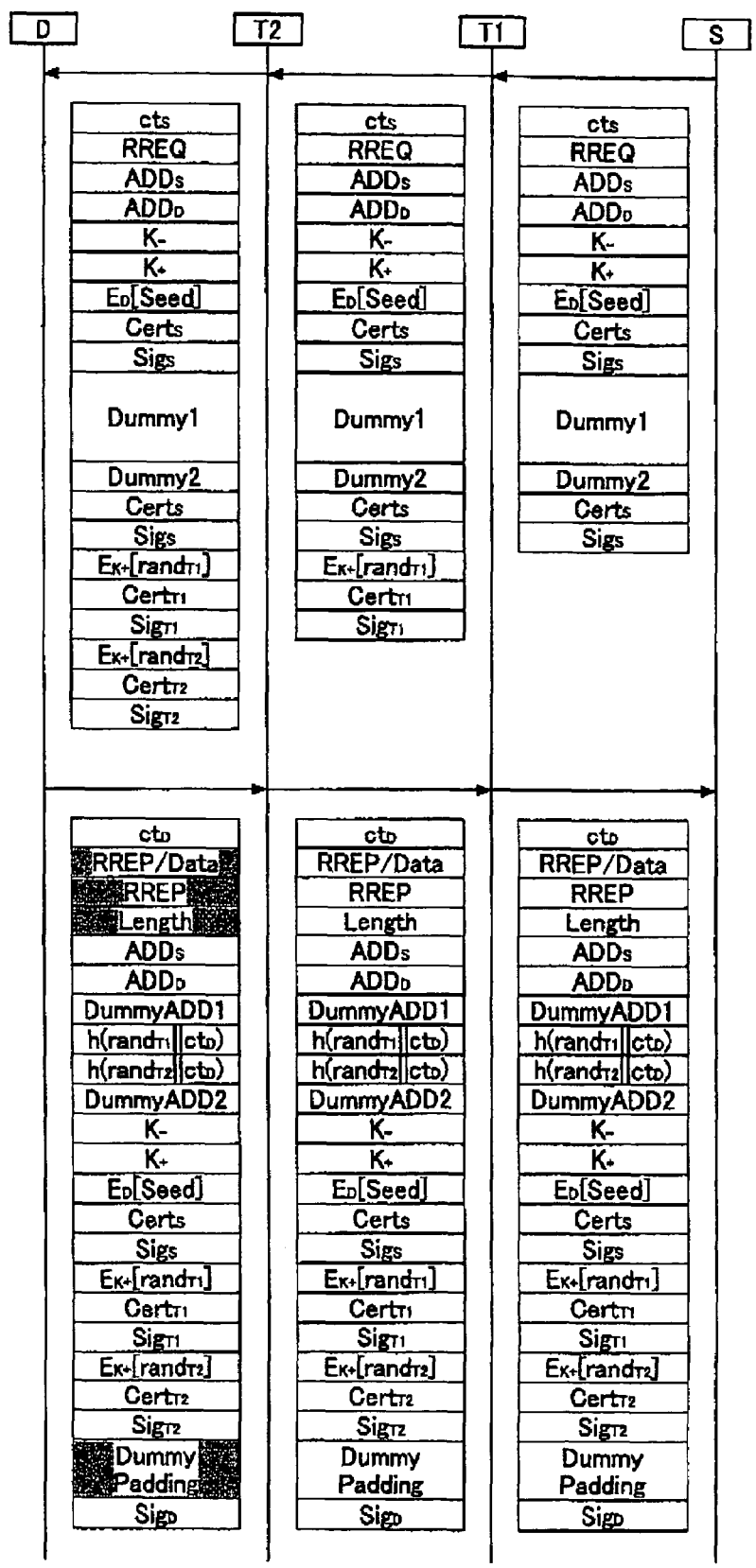
FIG. 16 is a chart illustrating routing control signals for constructing the ad hoc network according to the fifth embodiment of the present invention, hiding a RREP as much as possible.

With reference to FIGS. 14 through 16, a fifth embodiment of the present invention is explained below.

It is understood from FIG. 14, that there is a high risk that the information about the transmitting node S and receiving node D are leaked based on the RREQ packet length and the RREP relaying address list, as follows.

As for RREQ, it is understood from the packet length that the relaying node T1 is next to the transmitting node S.

As for RREP, if the relaying node T1 and the relaying node T2 are conspire, it is understood from the relaying address list that the receiving node D is next to the relaying node T2 (the transmitting node S is next to the relaying node T1).

An example is explained below, in which dummy information (random number) is utilized to have the transmitting node S and the receiving node D behave as relaying nodes, in order to hide the information about the transmitting node S and the receiving node D as much as possible.

FIG. 15 shows an example in which dummy information is given to the RREQ signal and the RREP signal, to have both the transmitting and receiving nodes behave as relaying nodes. Operation (especially portions different from the above example) is explained below.

The transmitting node S gives dummy relaying information (Dummy1 and Dummy2 meaning relaying nodes in FIG. 15) during the RREQ signal. Due to dummy information, even if the information about the transmitting node S is exposed, third party cannot distinguish a transmitting node from a relaying node.

The relaying node T1 receives the RREQ, and verifies the $\text{Sig}_S$. In the above example, since that the $\text{Sig}_S$ cannot be verified, the $\text{Sig}_S$ is not verified by assuming that the RREQ having a specific length is the RREQ from the transmitting node S. In this example, since that the transmitting node S behaves as a relaying node, the $\text{Cert}_S$ can be disclosed and authentication becomes possible.

The receiving node that has received the RREQ performs the following processing.

The receiving node decrypts the received signal using a temporary secret key K-, verifies the Sig of each relaying route in turn from the outermost one until the $\text{Cert}_S$ appears. In the immediately above example, the processing is repeated at the number of times that is expected from the total length of the relaying node information. That way cannot be used in this example, because that the transmitting node S pretends to be a relaying node.

The receiving node D adds dummy addresses (Dummy ADD1 and Dummy ADD2 in FIG. 15) to the relaying node address list in the RREP signal, and calculates exclusive OR of pseudo random number series.

The transmitting node S receives the RREP signal, and verifies the Sig of each relaying route as the receiving node D does.

It is understood from FIG. 15 that there is a risk that information relating to the relaying stage number is leaked based on the RREP signal packet length. It is enough that the contents of the RREP signal is recognized by the transmitting node S and the receiving node D, third party does not have to identify. An example where the RREP signal is hidden as much as possible is explained below.

FIG. 16 shows an example where the RREP signal is hidden as much as possible. Operation (especially portions different from the above example) is explained below.

The receiving node D performs the following processing in order to create the RREP signal.

In place of the RREP, the receiving node D adds a second identification field (RREP/Data), which only the transmitting node S can distinguish between the RREP and Data. Dummy information (random number) padding is added (Dummy Padding in FIG. 16). A Length field is added to set the length excluding the Dummy Padding. The second identification field, the Dummy Padding and the Length field are mask-patterned.

The transmitting node S receives the RREP/Data, removes the mask pattern set by the receiving node D, and performs the following processing.

1) Recognize the RREP based on the second identification field.

2) Remove the Dummy Padding with consideration of the Length field.

Sixth Embodiment

Figure 17:
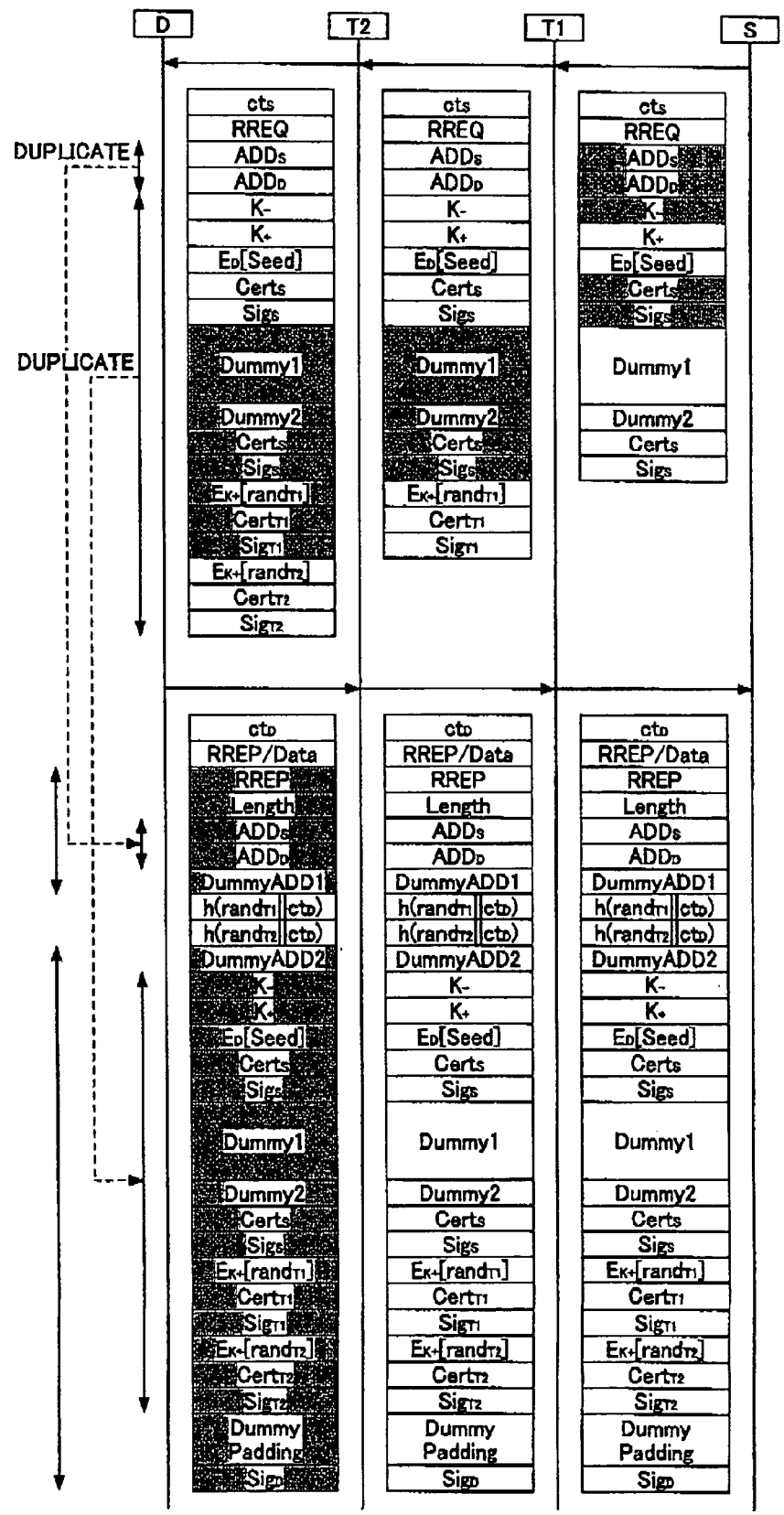
FIG. 17 is a chart illustrating routing control signals for constructing the ad hoc network including all the embodiments of the present invention.

FIG. 17 shows a sixth embodiment of the present invention. The sixth embodiment shown in FIG. 17 is an example in which the above examples are all included, and therefore an explanation is omitted.

Seventh Embodiment

Assuming that the relaying node T2 is a malicious relaying node, the relaying node T2 may intentionally discard the information about the relaying node T1. An example dealing with such malicious act is explained below.

With reference to FIG. 17, by having the information about the relaying node T1 and the information about the immediately preceding node Dummy 2 have inseparable relation, it may be detected that the relaying node T1 is discarded.

Figure 18:
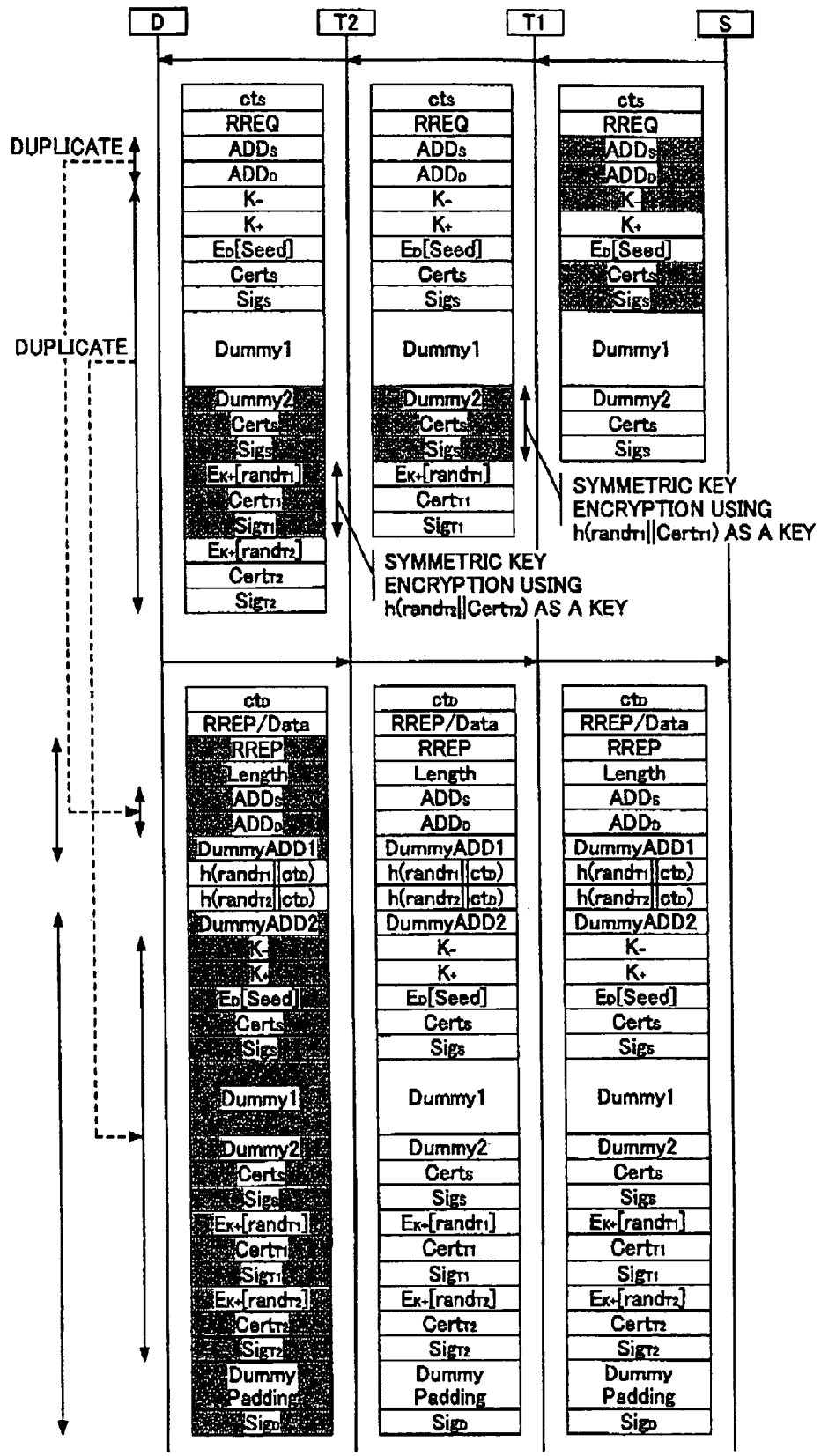
FIG. 18 is a chart illustrating routing control signals for constructing the ad hoc network according to a seventh embodiment of the present invention, preventing relaying node information from being discarded.

As shown in FIG. 18, the relaying node T1 block-encrypts the Dummy 2 information using a key of $K_{T1}=h(\text{rand}_{T1}, \text{Cert}_{T1})$ based on the information of the relaying node T1. A symbol "$\text{rand}_{T1}$" means a random number determined by the transmitting node T1, "$\text{Cert}_{T1}$" is a certificate of the transmitting node T1 issued by the certificate issuing unit, "h(y)" means a Hasche value of y.

The relaying node T2 also block-encrypts the information of the immediately preceding node T1 using a key of $K_{T2}=h(\text{rand}_{T2}, \text{Cert}_{T2})$ based on the information of the relaying node T2. In order to decrypt this encryption, the receiving node D needs to know the correct relaying node information.

Although this embodiment is explained using Dummy, this embodiment can be applied to existing relaying nodes and other variety of structures. Not only the immediate precedent node information but also more upstream node information can be encrypted.

By having the above structure, even if a malicious relaying node intentionally discards upstream relaying node information, the information of the node immediately before the discarded relaying node is not correctly decrypted. In this manner, the receiving node D can see through such a forged rout.

According to the embodiments of the present invention, without increasing processing burdens on relaying nodes, it is possible to prevent a malicious node from forging relaying node information, hide routing information so as to be unforgeable and improve privacy protection for a transmitter and a receiver.

Communication nodes and ad hoc network routing controlling methods can be utilized in radio or wired communication field requiring secrecy.

The present application is based on Japanese Priority Applications No. 2004-058072 filed on Mar. 2, 2004 and No. 2004-250816 filed on Aug. 30, 2004 with the Japanese Patent Office, the entire contents of which are hereby incorporated by reference.

What is claimed is:

1. An ad hoc network routing controlling method for generating an ad hoc network between plural communication nodes, comprising:

at a transmitting node, transmitting by broadcasting, data comprising an ad hoc routing request signal accompanied by a transmitting node address, a receiving node address and a transmitting node digital signature;

at a relaying node, authenticating the transmitting node digital signature in the data transmitted by the transmitting node, and adding a relaying node address and a relaying node digital signature to the transmitted data and forwarding the transmitted data including the relaying node address and relaying node digital signature by broadcasting; and at a receiving node, receiving the transmitted data and authenticating the relaying node digital signature and the transmitting node digital signature; and at the receiving node, adding a receiving node digital signature to the received data to make an ad hoc routing reply signal, and transmitting the ad hoc routing reply signal to the transmitting nodes, wherein the transmitting node symmetrically encrypts the transmitted data with a Session Key, and encrypts the Session Key with a public key before transmitting the data to the receiving node, and the receiving node decrypts the encrypted Session Key with its own secret key to obtain the Session Key, and uses the obtained Session Key to generate a symmetrical encryption output.

2. The ad hoc routing controlling method as claimed in claim 1, wherein the authenticating at the receiving node comprises decrypting the received data with a receiving node's own secret key.

3. The ad hoc routing controlling method as claimed in claim 1, further comprising:

encrypting the relaying node address.

4. The ad hoc routing controlling method as claimed in claim 3, wherein the encrypting comprises encrypting upstream relay node information utilizing a portion of the relay node information.

5. The ad hoc routing controlling method as claimed in claim 1, further comprising:

inserting a dummy address in the data.

6. The ad hoc routing controlling method as claimed in claim 1, further comprising:

inserting a dummy padding in the received data.

7. An ad hoc network routing controlling method for generating an ad hoc network between plural communication nodes, comprising:

at a transmitting node, encrypting at least a portion of data comprising an ad hoc routing request signal accompanied by a transmitting node address and a receiving node address, with a public key of a receiving node, and transmitting the encrypted data by broadcasting;

at a relaying node, adding a relaying node address to the transmitted data and forwarding the transmitted data including the relaying node address by broadcasting; and at a receiving node, receiving the forwarded data, and adding an ad hoc routing reply signal to the received data and transmitting the received data including the ad hoc routing reply signal to the transmitting node, wherein the encrypting at the transmitting node comprises determining a Session Key and hybrid encrypting the data with the Session Key, and the hybrid encrypting comprises encrypting the Session Key with a public key and symmetrically encrypting the data with the encrypted Session Key.

* * * * *